United States Patent Office 3,644,350
Patented Feb. 22, 1972

3,644,350
4-(1-SUBSTITUTED-3-PYRROLIDINYL)-2H-1,4-
BENZOXAZIN-3(4H)-ONES
Grover Cleveland Helsley, Richmond, Va., assignor to
A. H. Robins Company, Incorporated, Richmond, Va.
No Drawing. Filed July 7, 1969, Ser. No. 839,658
Int. Cl. C07d 87/48
U.S. Cl. 260—244 R     5 Claims

ABSTRACT OF THE DISCLOSURE

4 - [1 - substituted - 3 - pyrrolidinyl] - 2H - 1,4 - benzoxazin-3(4H)-ones prepared by ring closure of 1-substituted - 3 - (N - chloromethylcarbonyl) - o - hydroxyanilinopyrrolidines. The compounds are analgetics.

The present invention relates to a new group of 4-(1-substituted - 3 - pyrrolidinyl) - 2H - 1,4 - benzoxazin-3(4H)-ones of the general structural formula

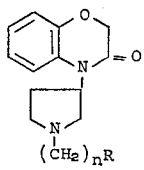

Formula I and the pharmaceutically acceptable salts thereof. In Formula I, R is hydrogen, phenyl and monosubstituted phenyl, and $n$ is a positive integer from 0 to 4 inclusive. Monosubstituted phenyl can represent halophenyls such as fluorophenyl, chlorophenyl and bromophenyl; alkoxyphenyls such as methoxyphenyl and ethoxyphenyl; alkylphenyls such as tolyl, isopropylphenyl, ethylphenyl and a trifluoromethylphenyl radical.

The organic bases of Formula I form pharmaceutically acceptable salts with inorganic acids such as hydrochloric, hydrobromic, sulfuric and sulfamic and with strong organic acids including oxalic, maleic, fumaric, citric, benzoic, tartaric, and related acids. The salts are readily prepared by methods known to the art.

The novel 4 - (1 - substituted - 3 - pyrrolidinyl)-2H-1,4-benzoxazin-3(4H)-ones of the present invention are prepared from 1-hydrocarbon-substituted - 3 - halo-(3-tosyl)-pyrrolidines as shown in Chart I. The aforementioned starting materials are prepared from the corresponding 3-pyrrolidinols as disclosed in U.S. Pats. 3,318,908 and 3,429,968.

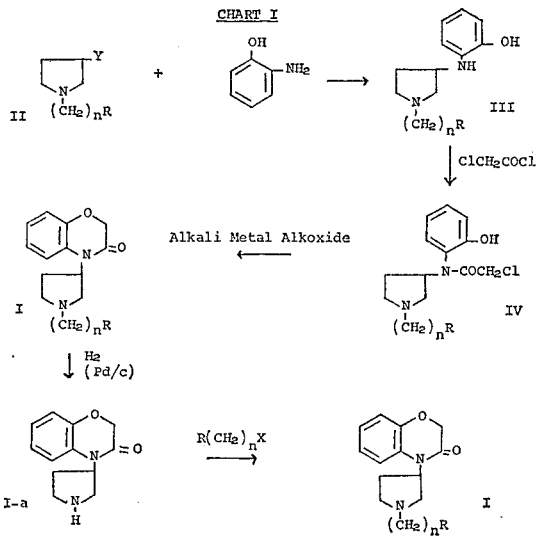

CHART I

In Chart I, Y represents a halogen atom or a tosyl group, R and $n$ have the values previously assigned. $R(CH_2)_nX$ represents compounds having a replaceable halogen atom X and R and $n$ have the values as given above.

The intermediate 1-hydrocarbon-3-(o-hydroxyanilino)pyrrolidines of Formula III are prepared by reacting 1-hydrocarbon-3-substituted pyrrolidines of Formula II, wherein Y is a replaceable halogen atom or a tosyl group with o-aminophenol. When Y is halogen, preferably chlorine, the reaction can be carried out with or without the presence of an additional solvent. When no solvent is present the reaction is generally carried out at the reflux temperature of o-aminophenol for a period of from about 10 to about 20 hours in the presence of a metal carbonate as, for example, potassium carbonate. When Y is a tosyl group the reaction is carried out in a dry inert solvent as, for example, toluene. The reaction is generally run at the reflux temperature of the solvent used for a period of from about 4 to 12 hours.

The intermediate compounds of Formula IV, 1-hydrocarbon - 3 - (N - chloromethylcarbonyl) - o - hydroxyanilinopyrrolidines are generally prepared by treating 1-hydrocarbon-3-(o - hydroxyanilino)pyrrolidines dropwise with a solution of chloroacetyl chloride in a chlorinated hydrocarbon, illustratively chloroform, at 0–10° C. Following the addition the reaction mixture is allowed to warm to room temperature to complete the reaction and then the solvent is removed by stripping at reduced pressure. The intermediates (IV) are usually not purified further but are dissolved in a lower alkanol such as isopropanol, an alkali metal alkoxide is added, illustratively sodium methoxide, and the mixture refluxed for a period of from about 10 to about 20 hours to form the 2H-1,4-benzoxazin-3(4H)-one.

When R is phenyl and $n$ is 1 in Formula I, thereby representing a benzyl group, the latter group is readily removed by hydrogenolysis using a palladium on charcoal catalyst to yield Ia, 4-(3-pyrrolidinyl)-2H-1,4-benzoxazine-3(4H)-one. The latter novel compound within the scope of I is especially useful as an intermediate as it can be reacted with a variety of reactive compounds selected from among those having replaceable halogen atoms as, for example, phenylalkyl halides, lower alkyl halides, ω-hydroxyalkyl halides and the like to prepare other compounds embraced by Formula I.

The reaction between 3-(pyrrolidinyl)-2H-1,4-benzoxazin-3(4H)-one and various reactants of Formula RX in Chart I to give additional novel compounds of Formula I are generally carried out in an inert hydrocarbon solvent as, for example, benzene, toluene, xylene, a lower alkanol, e.g., ethanol, propanol, n-butanol and in a solvent such as dimethylformamide. To facilitate the reactions and minimize by-product formation the reactions are preferably carried out at the reflux temperature of the solvent employed. An acid acceptor such as a metal carbonate is preferably present in the reaction mixture when a hydrogen halide is formed during the reaction.

The compounds of this invention have useful pharmacological properties. They have been found useful for administration to laboratory animals in studying the behavior thereof and in studying drug effects on the central and peripheral nervous system. The compounds corresponding to Formula I have been found to be particularly useful as analgetic agents.

They are active in mice and rats in intraperitoneal doses of 20–200 mg./kg. when evaluated in the standard test procedure in which animals are administered a compound and observed for behavorial effects.

The novel compounds of the present invention are formulated for use by incorporating them into standard pharmaceutical dosage forms such as capsules, tablets and injectables containing 0.1 to 500 mg., the exact dosage varying with the weight and age of the subject being treated, and the severity of the condition. Among the pharmaceutical excipients which can be used are gelatin, talc, lactose, magnesium carbonate and sodium carboxymethylcellulose.

It is, accordingly, an object of the present invention to provide novel compounds which are useful as analgetics. A further object is to provide a method for preparing the novel 4-(1-substituted-3-pyrrolidinyl)-2H-1,4-benzoxazine-3(4H)-ones of the present invention. Additional objects will be apparent to one skilled in the art and still other objects will become apparent hereinafter.

The compounds which constitute this invention and the methods for preparation will appear more fully from a consideration of the following examples which are given for purpose of illustration only and are not to be construed as limiting the invention in spirit or in scope.

EXAMPLE 1

1-benzyl-3-(o-hydroxyanilino)pyrrolidine

A mixture of 240 g. (1.0 mole) of 3-bromo-1-benzylpyrrolidine, 109 g. (1.0 mole) of o-aminophenol and 138 g. (1.0 mole) of potassium carbonate was stirred at reflux for 16 hours. The reaction mixture was filtered hot and the cooled filtrate extracted with 500 ml. of 3 N sodium hydroxide. The basic layer was separated, acidified with 6 N hydrochloric acid and the acid solution extracted with ether. The acidic layer was neutralized with sodium bicarbonate and extracted with chloroform. The combined chloroform extracts were washed with water, dried over magnesium sulfate and the solvent evaporated at reduced pressure. The residual oil which crystallized on standing was recrystallized from benzene. The tan product weighed 58.5 g. (22% yield) and melted at 115–116° C.

*Analysis.*—Calculated for $C_{17}H_{20}N_2O$ (percent): C, 76.09; H, 7.51; N, 10.44. Found (percent): C, 76.09; H, 7.53; N, 10.22.

EXAMPLE 2

1-ethyl-3-(o-hydroxyanilino)pyrrolidine

To a dry toluene solution of 255.3 g. (1.0 mole) of 1-ethyl-3-pyrrolidinol benzenesulfonate was added 218.2 g. (2.0 moles) of o-aminophenol and the mixture stirred overnight at 110° C. The cooled reaction mixture was basified with dilute sodium hydroxide solution and the basic solution was extracted with ether. The basic solution was acidified with dilute hydrochloric acid and the acidic solution was extracted with ether. The acidic solution was made basic with sodium bicarbonate and extracted with chloroform. The chloroform extracts were combined and concentrated under reduced pressure to a viscous dark residue which was repeatedly washed with acetone removing acetone soluble materials. The residual material was recrystallized several times from methylisobutyl ketone. The 1-ethyl-3-(o-hydroxyanilino)pyrrolidine melted at 168–169° C. and was obtained in approximately 50% yield.

*Analysis.*—Calculated for $C_{12}H_{18}N_2O$ (percent): C, 69.87; H, 8.80; N, 13.58. Found (percent): C, 69.63; H, 8.81; N, 13.86.

EXAMPLE 3

When the procedures of Examples 1 and 2 are followed, the following compounds 1-methyl-3-(o-hydroxyanilino)pyrrolidine;
1-propyl-3-(o-hydroxyanilino)pyrrolidine;
1-(p-bromobenzyl)-3-(o-hydroxyanilino)pyrrolidine;
1-(p-chlorobenzyl)-3-(o-hydroxyanilino)pyrrolidine;
1-(o-tolyl)-3-(o-hydroxyanilino)pyrrolidine;
1-phenyl-3-(o-hydroxyanilino)pyrrolidine;
1-(m-trifluoromethylphenyl)-3-(o-hydroxyanilino)pyrrolidine;
1-(3-phenylpropyl)-3-(o-hydroxyanilino)pyrrolidine;
1-(p-methoxybenzyl)-3-(o-hydroxyanilino)pyrrolidine;
1-(o-methoxyphenyl)-3-(o-hydroxyanilino)pyrrolidine;

are prepared by reacting o-aminophenol and 1-methyl-3-bromopyrrolidine;
1-propyl-3-bromopyrrolidine;
1-(p-bromobenzyl)-3-pyrrolidinol tosylate;
1-(p-chlorobenzyl)-3-pyrrolidinol tosylate;
1-(o-tolyl)-3-chloropyrrolidine;
1-phenyl-3-pyrrolidinol tosylate;
1-(m-trifluoromethylphenyl)-3-pyrrolidinol tosylate;
1-(3-phenylpropyl)-3-chloropyrrolidine;
1-(p-methoxybenzyl)-3-chloropyrrolidine, and
1-(o-methoxybenzyl)-3-chloropyrrolidine.

EXAMPLE 4

4-(1-benzyl-3-pyrrolidinyl)-2H-1,4-benzoxazin-3(4H)-one

To a stirred solution of 26.8 g. (0.10 mole) of 1-benzyl-3-(o-hydroxyanilino)pyrrolidine in 250 ml. of chloroform maintained at 0–5° C. was added slowly a solution of 11.3 g. (0.10 mole) of chloroacetyl chloride in 50 ml. of chloroform. After the addition was complete the mixture was allowed to warm to room temperature. The solvent was removed at reduced pressure and the residual oil was dissolved in 500 ml. of isoproapnol and treated with 10.8 g. (0.20 mole) of sodium methoxide. The reaction mixture was stirred at reflux for 16 hours, cooled and filtered. The solvent was evaporated at reduced pressure, and residual oil was taken up in isopropyl ether, the solution was extracted with 1 N sodium hydroxide, washed with water, dried, and the solvent evaporated at reduced pressure. The residual oil was distilled at reduced pressure and the fraction boiling at 188–191° C./0.01 mm. was collected. The viscous oil weighed 14.0 g. (50% yield).

*Analysis.*—Calculated for $C_{19}H_{20}N_2O_2$ (percent): C, 74.00; H, 6.54; N, 9.08. Found (percent): C, 73.92; H, 6.64; N, 8.93.

EXAMPLE 5

4-(1-ethyl-3-pyrrolidinyl)-2H-1,4-benzoxazin-3(4H)-one fumarate

To a stirred solution of 5.0 g. (0.0243 mole) of 1-ethyl-3-(o-hydroxyanilino)pyrrolidine in 125 ml. of chloroform maintained at 5–10° C. was added dropwise a solution of 2.72 g. (0.243 mole) of chloroacetyl chloride in 50 ml. of chloroform. After the addition was complete, the solution was stirred for 2 hours at ambient temperature and then the solvent was evaporated at reduced pressure. The residual oil was taken up in 125 ml. of isopropanol and treated with 2.70 g. (0.05 mole) of sodium methoxide. The mixture was stirred at reflux for 16 hours, filtered and the solvent was evaporated at reduced pressure. The residue was taken up in isopropyl ether and the solution was extracted with 1 N sodium hydroxide, washed with water, dried over magnesium sulfate and the solvent evaporated at reduced pressure. The residual oil which weighed 2.8 g. was dissolved in ethyl ether and treated with a solution of 1.3 g. (0.011 mole) of fumaric acid in warm isopropanol. The fumarate salt which formed on standing was separated by filtration and recrystallized from an isopropyl ether-isopropanol mixture yielding 2.3 g. (31%) of the fumarate salt which melted at 155–156° C.

*Analysis.*—Calculated for $C_{18}H_{22}N_2O_6$ (percent): C, 59.66; H, 6.12; N, 7.73. Found (percent): C, 59.29; H, 6.13; N, 7.57.

EXAMPLE 6

When the procedures of Examples 4 and 5 are followed, the following compounds 4-(1-methyl-3-pyrrolidinyl)-2H-1,4-benzoxazin-3(4H)-one;

4-(-propyl-3-pyrrolidinyl)-2H-1,4-benzoxazin-3(4H)-one;
4-[1-(p-bromobenzyl)-3-pyrrolidinyl]-2H-1,4-benzoxazin-3(4H)-one;
4-[1-(p-chlorobenzyl)-3-pyrroldinyl]-2H-1,4-benzoxazin-3(4H)-one;
4-[1-(o-tolyl)-3-pyrrolidinyl]-2H-1,4-benzoxazin-3(4H)-one;
4-[1-(m-trifluoromethylphenyl)-3-pyrrolidinyl]-2H-1,4-benzoxazin-3(4H)-one;
4-[1-(3-phenylpropyl)-3-pyrrolidinyl]-2H-1,4-benzoxazin-3(4H)-one;
4-[1-(p-methoxybenzyl)-3-pyrrolidinyl]-2H-1,4-benzoxazin-3(4H)-one;
4-[1-(o-methoxybenzyl) - 3-pyrrolidinyl]-2H-1,4-benzoxazin-3(4H)-one;

are prepared by reacting chloroacetyl chloride and 1-methyl-3-(o-hydroxyanilino)pyrrolidine;
1-propyl-3-(o-hydroxyanilino)pyrrolidine;
1-(p-bromobenzyl)-3-(o-hydroxyanilino)pyrrolidine;
1-(p-chlorobenzyl)-3-(o-hydroxyanilino)pyrrolidine;
1-(o-tolyl)-3-(o-hydroxyanilino)pyrrolidine;
1-phenyl-3-(o-hydroxyanilino)pyrrolidine;
1-(m-trifluoromethylphenyl)-3-(o-hydroxyanilino)pyrrolidine;
1-(3-phenylpropyl)-3-(o-hydroxyanilino)pyrrolidine;
1-(p-methoxyphenyl)-3-(o-hydroxyanilino)pyrrolidine, and
1-(o-methoxyphenyl)-3-(o-hydroxyanilino)pyrrolidine followed by cyclization using a metal alkoxide.

EXAMPLE 7
4-(3-pyrrolidinyl)-2H-1,4-benzoxazin-3(4H)-one hydrochloride

A solution of 15.4 g. of 4-(1-benzyl-3-pyrrolidinyl)-2H-1,4-benzoxazin-3(4H)-one in 200 ml. of 95% ethanol and 5 g. of 10% palladium-on-charcoal catalyst was shaken in 3 atmospheres of hydrogen at 70° C. until one equivalent of $H_2$ was taken up. The cooled suspension was filtered and the solvent evaporated at reduced pressure to give 10.2 g. of product (94% yield). A portion (2.0 g.) of the free base was converted to the hydrochloride salt which was recrystallized from an isopropanol-isopropyl ether mixture to give 1.4 g. of the hydrochloride salt which melted at 215.5–217° C.

Analysis.—Calculated for $C_{12}H_{15}ClN_2O_2$ (percent): C, 56.59; H, 5.94; N, 11.00. Found (percent): C, 56.43; H, 5.96; N, 10.78.

EXAMPLE 8
4-[1-(2-phenyl)ethyl-3-pyrrolidinyl]-2H-1,4-benzoxazin-3(4H)-one oxalate A mixture of 8.1 g. (0.037 mole) of 4-(3-pyrrolidinol)-2H-1,4-benzoxazin-3(4H)-one, 7.4 g. (0.040 mole) of phenethyl bromide, 15 g. potassium carbonate and 100 ml. of dry toluene was stirred at reflux for 16 hours, cooled and treated with 100 ml. of water. The organic layer was separated, washed with water, dried over magnesium sulfate, filtered and the solvent evaporated. The residual oil was dissolved in ethyl ether, the solution filtered, and the filtrate evaporated, leaving 7.7 g. (65% yield) of residual oil. A portion of the free base, 7.0 g. (0.022 mole), was treated with 2.8 g. (0.022 mole) of oxalic acid dihydrate in isopropanol. The oxalate salt which formed was recrystallized from isopropanol yielding 5.0 g. of the oxalate salt which melted at 92–93.5° C.

Analysis.—Calculated for $C_{22}H_{24}N_2O_6$ (percent): C, 64.07; H, 5.87; N, 6.79. Found (percent): C, 64.07; H, 5.82; N, 6.79.

EXAMPLE 9

When the procedure of Example 8 is followed, the following compounds:

4-[1-(p-fluorophenylethyl)-3-pyrrolidinyl]-2H-1,4-benzoxazin-3(4H)-one;
4-[1-(p-fluorobenzyl)-3-pyrrolidinyl]-2H-1,4-benzoxazin-3(4H)-one;
4-[1-(o-ethylbenzyl)-3-pyrrolidinyl]-2H-1,4-benzoxazin-3(4H)-one;
4-[1-(p-ethylbenzyl)-3-pyrrolidinyl]-2H-1,4-benzoxazin-3(4H)-one;
4-[1-(p-ethoxyphenylethyl)-3-pyrrolidinyl]-2H-1,4-benzoxazin-3(4H)-one, and
4-[1-o-ethoxyphenylethyl)-3-pyrrolidinyl]-2H-1,4-benzoxazin-3(4H)-one are prepared by reacting 4-(3-pyrrolidinyl)-2H-1,4-benzoxazin-3(4H)-one, and p-fluorophenylethyl bromide;
p-fluorobenzyl bromide;
o-ethylbenzyl bromide;
p-ethylbenzyl bromide;
p-ethoxyphenylethyl bromide, and
o-ethoxypenylethyl bromide.

What is claimed is:
1. A compound selected from (a) 4-(1-substituted-3-pyrrolidinyl)-2H-1,4-benzoxazine - 3(4H) - ones of the formula:

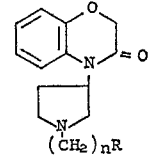

wherein;
R is selected from the group consisting of hydrogen, phenyl and monosubstituted phenyl, wherein monosubstituted phenyl is halophenyl, methoxyphenyl, and trifluoromethylphenyl,
n is a positive integer from 0–4 inclusive, and (b) pharmaceutically acceptable salts thereof.
2. A compound of claim 1 which is 4-(3-pyrrolidinyl)-2H-1,4-benzoxazin-3(4H)-one.
3. A compound of claim 1 which is 4-(1-benzyl-3-pyrrolidinyl)-2H-1,4-benzoxazin-3(4H)-one.
4. A compound of the claim 1 which is 4-[1-(2-phenylethyl)-3-pyrrolidinyl]-2H-1,4-benzoxazin-3(4H)-one.
5. A compound of claim 1 which is 4-(1-ethyl-3-pyrrolidinyl)-2H-1,4-benzoxazin-3(4H)-one.

References Cited
UNITED STATES PATENTS

| 1,915,334 | 6/1933 | Salzberg et al. | 260—243 |
| 2,075,359 | 3/1937 | Salzberg et al. | 424—250 |
| 3,401,166 | 9/1968 | Krapcho | 260—247.1 |
| 3,080,372 | 3/1963 | Janssen | 260—293.2 |

HENRY R. JILES, Primary Examiner

S. D. WINTERS, Assistant Examiner

U.S. Cl. X.R.

260—326.87, 326.8, 326.82, 326.5 L, 326.3; 424—248

UNITED STATES PATENT OFFICE
CERTIFICATE OF CORRECTION

Patent No. 3,644,350        Dated Feb. 22, 1972

Inventor(s) Grover Cleveland Helsley

It is certified that error appears in the above-identified patent and that said Letters Patent are hereby corrected as shown below:

Column 4, line 28, change "isoproapnol" to read --isopropanol--; line 48, change "0.243" to --0.0243--. Column 6, line 27, change "o-ethoxypenylethyl" to read --o-ethoxyphenylethyl--.

Signed and sealed this 25th day of July 1972.

(SEAL)
Attest:

EDWARD M. FLETCHER, JR.        ROBERT GOTTSCHALK
Attesting Officer              Commissioner of Patents